United States Patent [19]
Becker

[11] 3,805,014
[45] Apr. 16, 1974

[54] RESISTANCE WELDING

[76] Inventor: Otto Alfred Becker, Robert Koch Strasse 59, 66 Saarbruecken 6, Germany

[22] Filed: Mar. 28, 1972

[21] Appl. No.: 238,918

[52] U.S. Cl. .................................. 219/92, 219/93
[51] Int. Cl. .............................................. B23k 9/28
[58] Field of Search ..................... 219/91, 92, 93, 94

[56] References Cited
UNITED STATES PATENTS

| | | | |
|---|---|---|---|
| 3,629,544 | 12/1971 | Becker | 219/93 |
| 3,686,462 | 8/1972 | Erlandson | 219/93 |
| 3,555,964 | 1/1971 | Fleming | 90/14 |
| 3,527,138 | 9/1970 | Boltz | 90/11 |

*Primary Examiner*—J. V. Truhe
*Assistant Examiner*—Hugh D. Jaeger
*Attorney, Agent, or Firm*—Erich M. H. Radde

[57] ABSTRACT

Metal sheets or other metal articles consisting of the same or different metals and being of the same or different thickness are joined by resistance welding to each other by first providing a plurality of contact bridges preferably of linear shape, for instance, ribs, projections, and the like at least on one of the welding surface areas of said metal articles or on their cut edges and then effecting resistance welding, especially by means of condenser discharge welding machines after contacting the welding surface areas under pressure. The contact bridges are produced by means of mechanically rotating cutting tools, such as milling cutters, turning tools and the like. The contact bridges can be replaced by profiled inserts which are inserted between the bare welding surface areas or cut edges of the metal articles.

10 Claims, 13 Drawing Figures

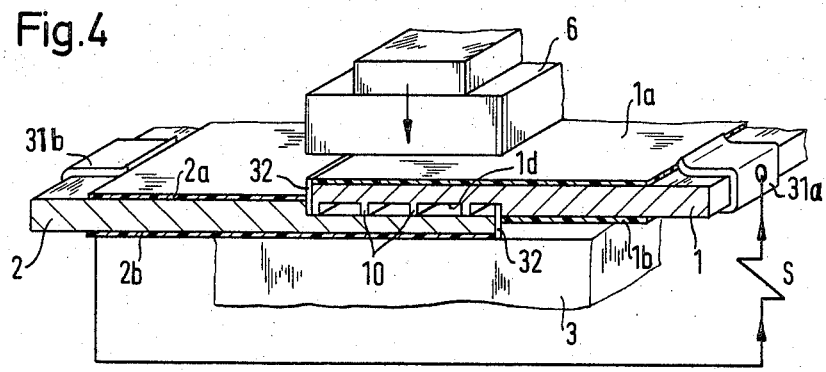
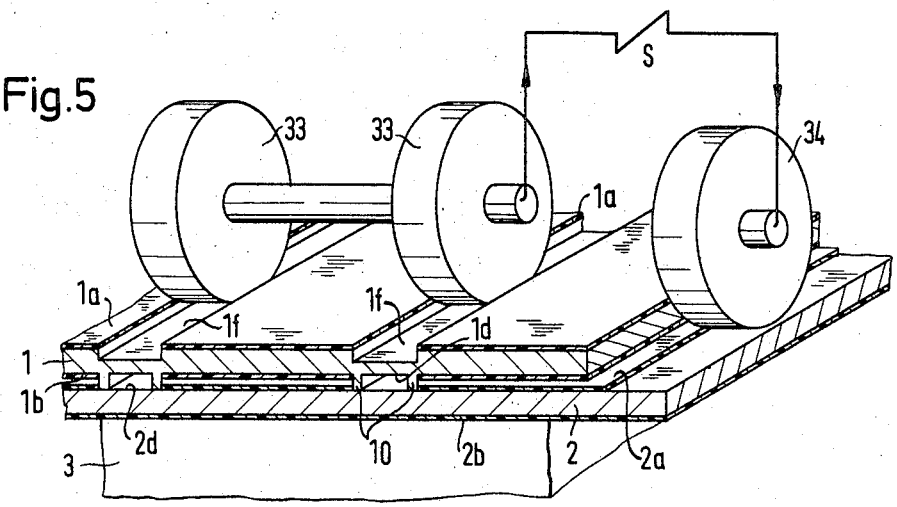
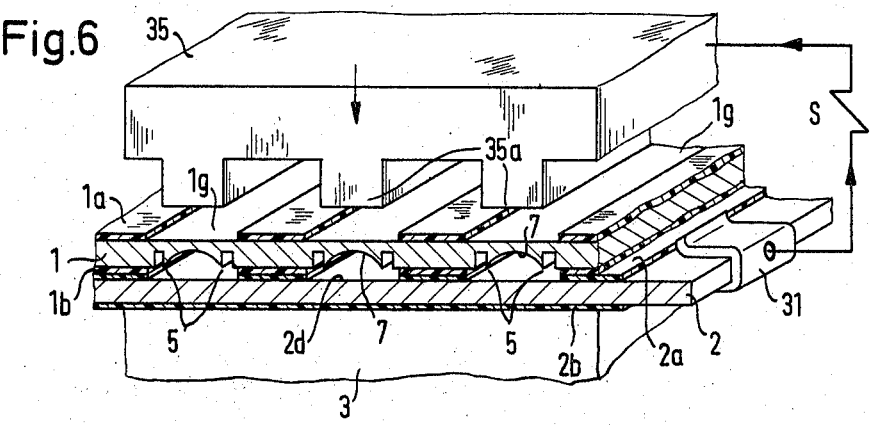

RESISTANCE WELDING

BACKGROUND OF THE INVENTION

1. Field of the Invention

The present invention relates to an improved method of connecting together and joining surfaces of metal sheets or bodies as well as the surfaces of cut edges of any type of metal with similar or other metal parts of the same or different type of metal and being of the same or different thickness, by resistance welding, for instance by means of condenser impulse welding machines and to welded and joined metal sheets or articles obtained thereby.

2. Description of the Prior Art

Sheet metal plates or articles which have been coated with coatings of an insulating nature or with metallic coatings of a different conductivity, have been made for many years. Heretofore, however, joining by welding the surfaces or cut edges of such sheet metals in an economical manner by resistance welding has not been possible and usually the strength of the bond or joint was insufficient or the appearance and properties of the coatings were impaired by the heat of welding.

SUMMARY OF THE INVENTION

It is one object of the present invention to provide an improved and economical process of joining by welding the surfaces or the cut edges of sheet metals, metal plates, or articles, or the like which may or may not be provided with a coating of an insulating nature or a metallic coating of different conductivity whereby a weld of surprisingly high strength is produced.

Another object of the present invention is to provide sheet metals, metal plates, or metallic articles the surfaces or cut edges of which are firmly joined to each other by resistance welding.

A further object of the present invention is to provide a welding assembly and apparatus for carrying out the welding process according to the present invention.

Other objects of the present invention and advantageous features thereof will become apparent as the description proceeds.

In principle the process according to the present invention comprises the feature that a plurality of contact bridges are formed on the surfaces or cut edges to be joined by mechanically actuated rotating tools, for instance, by milling cutters. According to another embodiment of the present invention linear or otherwise shaped profiled insert pieces serving as contact bridges of the same or different metals or of suitable alloys ar arranged between the surfaces to be welded. Thereby, the parts to be joined are moved towards each other during the welding under spring pressure exerted by electrodes or by currentless pressure means. Welding can be effected exclusively by resistance welding or it may be carried out while additionally and simultaneously welding arcs are formed, for instance, by the use of condenser discharge welding currents. In the latter case, the welding or the like should be effected in such a manner that, after the ribs, bridges, projections, and the like produced, for instance, by milling have been melted away, the surface areas of the sheet metals, plates, and the like which have been partially melted during this time by the electric arcs are also connected with and joined to each other.

For instance, linear contact bridges can be produced, for instance, by milling curved grooves or U-shaped recesses linearly along each other at the welding areas.

In this manner there are produced rib-like or strip-like contact bridges which serve for welding together the surface of one of the plates or the like to be welded, for instance, of a metal plate, with the surface of the other plate or the like to be welded. Thereby, the welding current is conducted into the one plate or the like at any place thereof by means of electrodes or contact clamps or the like and is led away from the other plate or the like in the same or a similar manner. When proceeding in this manner, the welding pressure is applied, for instance, by currentless, preferably spring actuated pressure ledges, rams, rollers, or the like. Thereby, welding of the two plates or the like is effected.

Such linearly milled recesses can be supplemented by transverse millings and the ribs, strips, and the like which are thus subdivided into short pieces of any desired length, in extreme cases down to spots.

If grid-like weldings extending over a surface are to be effected, the linear contact bridges can be cut away by milling at both surfaces so that they intersect each other when placed one over the other. They are then welded to each other only at said points of intersection (see FIGS. 3 and 9).

By suitably selecting the welding parameters it is possible to weld all the ribs, strips, projections, and the like, i.e., also those positioned between the points of intersection onto the opposing welding surfaces, or else, in addition thereto, if there is sufficient electrical energy available, to melt away completely the ribs, strips, projections, or the like and to achieve an areally extending welded joint by simultaneous welding arc formation.

The welding surfaces provided with contact bridges can be embossed so as to protrude towards the mating plate whereafter, or even before, contact bridges coresponding to said embossed projections can be formed by milling or the like.

If no embossing is effected, the contact bridges can be pressed upon the welding surface of the opposing plate by means of the welding electrodes or pressure rams and welding can then be effected (see FIG. 6).

The cut edges of plates of greater thickness also form surfaces which can be provided by milling or the like with ribs, strips, projections, and the like, particularly of linear shape so as to achieve a high electric resistance and thus to effect with relatively small welding energy welding together of the surfaces of the cut edges, for instance, of two metal sheets, plates, articles or the like which are pressed together under spring action while positioned in the same plane (see FIGS. 7 to 13).

Instead of profiling the cut edges by milling or the like, they can remain flat and profiled, linear welding inserts of the same or a different metal or metal alloy can be placed between the cut edges. Depending on the specific requirements, it is possible to establish a higher or lower electrical resistance by inserting welding inserts of different profiles.

The parts to be welded, for instance, plates, metal articles, or the like, may be of different thickness and/or of the same or a different type of metal. They may also be bare or coated with insulating or metallic layers.

As insulating layers there may be provided organic layers, for instance, of plastics, varnish layers, and the like coatings, or inorganic layers such as oxide films, particularly on aluminum plates, phosphate layers or the like. Metallic coatings may consist of zinc, tin, copper, brass, nickel, chromium or other metals. If these coatings render welding difficult or prevent it completely, or if they form, on welding, alloys with the electrodes which damage or destroy them, they are preferably removed by mechanically rotating tools, for instance, milling cutters, at the welding points and/or areas.

When uncoated metal sheets, plates, or metallic articles are to be welded, it is possible, by placing between said plates or the like permanent or detachable insulating coatings, for instance, by application of a plastic foil, a varnish, or the like, and milling away or otherwise removing said insulating coatings at the areas to be welded together, to force the welding current to flow only through welding places or areas which are stripped and thus metallically bare.

The thickness of the plates or the like to be welded, for instance, of the flat opposing plate, can be reduced by milling the one or the other side or both sides of the surface (see FIG. 4).

Furthermore, plates, metallic articles, or the like of unequal thickness can be rendered of equal thickness by milling or the like so that the thickness of the thicker plate is adjusted to that of the thinner plate and that the plates offer equal electrical resistance to the welding current. This is achieved, for instance, by milling recesses into the thicker plate. When proceeding in this manner, the welding can be carried out under optimum conditions, i.e., as if the plates were of the same thickness.

Different types of metals which are capable of alloying, can also be welded to each other under optimum conditions despite their different melting points by varying their electrical resistance by suitably changing their shape and thickness by milling or the like. In this connection the metal plate or the like, the melting point of which is higher than the melting point of the opposing plate, is preferably changed in shape or thickness by milling or the like, so as to increase its electrical resistance. In this manner the welding parameters of the different plates or the like can be adapted to each other so that the same welding effect is achieved for both plates or articles to be welded.

The alloys produced at the welding spots, areas, or cut edges on welding, may have higher strength characteristics than the metals to be welded as such.

Furthermore, it is possible to produce such a high electrical resistance by milling or the like that alloys are formed which otherwise cannot be produced or can be produced with great difficulty only.

Of course, plates, articles, or the like of unequal thickness which consist of different metals or alloys and which require, if necessary, an insert of a corresponding or a different metal or alloy in order to achieve optimum welding results, can also be joined by means of the process of the present invention.

The width as well as the height of the ribs, strips, projections, and the like to be provided at the areas to be welded, is preferably less than 1 mm.

The hereinabove described embodiments of the process of the present invention can also be used for seam welding, for instance, by means of rollers, for spot welding, and for other types of welding.

BRIEF DESCRIPTION OF THE DRAWINGS

Further and more specific objects, features, and advantages of the invention will appear from the following description and the claims annexed hereto, taken in connection with the accompanying drawings which illustrate by way of example preferred forms of the present invention.

In said drawings:

FIG. 4 is a diagrammatic view similar to that of FIG. 1 and illustrating an embodiment of the present invention to weld the overlapping edges of two metal plates coated on both sides.

FIG. 5 is a diagrammatic view similar to that of FIG. 2 and illustrating an embodiment of the present invention to weld two metal plates coated on both sides, the upper plate thereof being provided with embossings in contact with the stripped lower plate, said embossings being shaped differently from the embossings of FIG. 2, whereby the welding current is supplied to and conducted away from the plates to be welded by means of welding rollers.

FIG. 6 is a diagrammatic view similar to that of FIG. 2 and illustrating another embodiment of the present invention to weld two metal plates coated on both sides, the upper plate thereof also being provided with embossings in contact with the stripped lower plate and the coating being also removed from its upper face so as to allow block electrodes to supply the welding current through the bare stripped face thereof to said upper plate and through the embossings to the lower plate.

In said drawings like index numerals refer to like parts of the various embodiments of this invention.

DESCRIPTION OF THE PREFERRED EMBODIMENTS

Figure 1:
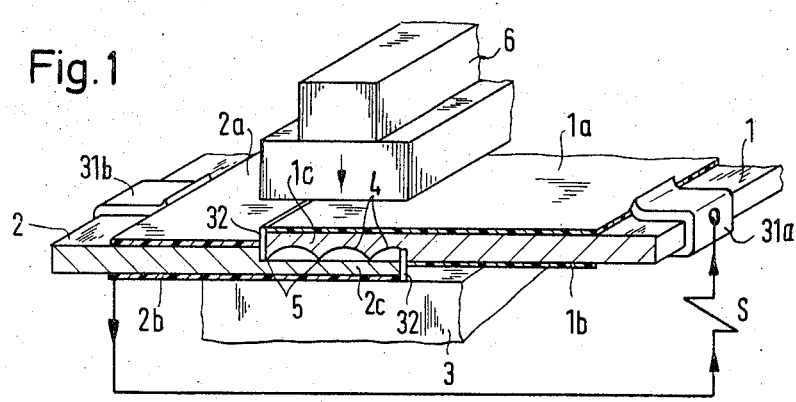
FIG. 1 is a diagrammatic view illustrating in perspective an embodiment of the present invention to weld the overlapping edges of two metal plates coated on both sides.

FIG. 1 shows upper sheet metal plate 1 being provided with an upper coating 1a and a lower coating 1b. The lefthand edge 1c of said plate 1 is to be welded to an edge or border strip 2c of sheet metal plate 2 also provided with an upper coating 2a and a lower coating 2b. To effect welding coating 2a is removed from the border or edge strip 2c of plate 2. Likewise coating 1b is removed from the edge strip 1c of upper plate 1. The stripped edge strip 1c of plate 1 which rests on edge strip 2c of plate 2 is cut by milling so as to form three slightly upwardly arched grooves 4 with points 5. In this way there are produced acute-angled, linearly protruding points of contact with the edge strip 2c of plate 2. By means of spring-applied pressure ledge or gib 6, edge strip 1c of plate 1 is pressed against edge strip 2c of lower plate 2 while acute-angled ribs 5 melt during welding. Table 3 serves as support. The welding current is supplied through clamp 31a via plate 1 over acute-angled ribs 5 to plate 2 and is returned or lead off through another clamp 31b which engages a stripped part of plate 2. In order to avoid contact along the cut edges of edge parts 1c and 2c to be welded to each other, insulating tapes 32 are inserted on both sides. Thereby the welding current is forced to flow through the acute-angled ribs 5 of plate 1 into plate 2.

On selecting appropriate welding parameters, the lower coating 2b remains undamaged in spite of the welding operation. Capacitor-discharge welding currents are particularly suitable for effecting welding of plates 1 and 2 whereby outer coating 2b as well as upper coating 1a are protected and unaffected.

Of course, welding can also be effected in this manner with uncoated, i.e., blank sheet metal plates. In this case suitably shaped electrodes may replace pressure stamp 6 and table support 3.

It is also possible to effect welding by means of upper and lower welding rollers.

In the case of coated plates, coating 1c can be removed from one edge, in FIG. 1 the lefthand edge 1c of plate 1 to form a bare metal strip through which the welding current is supplied by means of an upper roller, while the current is conducted away, for instance, via clamp 31 attached to plate 2.

Figure 2:
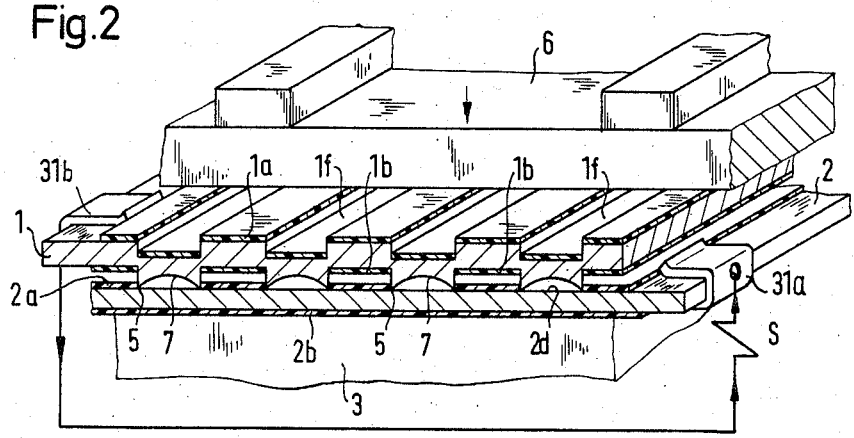
FIG. 2 is a diagrammatic view illustrating in perspective an embodiment of the present invention to weld two metal plates coated on both sides, the upper plate thereof being provided with embossings in contact with the stripped lower plate.

FIG. 2 shows upper sheet metal plate 1 coated on both sides with coatings 1a and 1b. Said plate has ledge-like or ridge-like embossings 7 towards plate 2. These embossings can be provided after strip-shaped removal of the coating from corresponding places on the lower face of plate 1. Said emobossings 7 are provided with acute-angled ribs 5 during the embossing operation, or corresponding recesses, for instance, arched recesses 7 are produced by milling with suitably shaped disk-type milling cutters.

In this case the lower coating 1b remains unaffected between the strip-shaped embossings 1f. It is, of course, also possible to use a sheet metal plate which is not coated on its lower face or bottom surface. Plate 1 which has been provided in this manner with strip-shaped embossings is placed upon plate 2 which is coated on both sides and from which the coating 2a is removed by milling to expose the bare metal surface in the form of strips provided in juxtaposed position to the embossed strips 7 and acute-angled ribs 5 of plate 1. The welding current is supplied via clamp 31b to plate 2 and is led away from plate 1 via another clamp 31a. In order to exert the required welding pressure, pressure plate 6 with spring-actuated application is provided. On welding together of the two plates or metal sheets, the plastic coating located laterally to ribs 5 is liquefied and as a result thereof all welding areas are sealed against access of air and moisture.

Otherwise the description given with respect to FIG. 1 applies also to the welding procedure as illustrated in FIG. 2. In particular the faces of bare plates and metal sheets can also be welded areally to each other in this manner.

Figure 3:
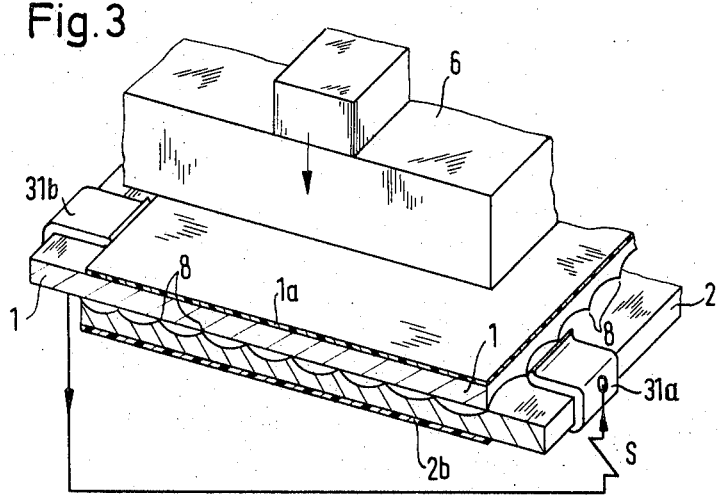
FIG. 3 is a diagrammatic view illustrating in perspective an embodiment of the present invention to weld two metal plates coated on both sides, both plates being provided with juxtaposed embossings.

FIG. 3 shows two plates 1 and 2 placed one above the other. Said plates are provided on one side only with coatings 1a and 2b, while the surfaces of contact of said plates are not coated. The lower face of plate 1 is provided in its longitudinal direction with hollow milled recesses which leave acute-angled ribs 8a protruding. Plate 2, in contrast thereto, is provided in transverse direction with milled recesses, whereby acute-angled ribs 8b are formed. When plate 1 is placed on top of plate 2, ribs 8a and 8b cross each other and thus contact each other only at the points of intersection where they form a grid. As a result thereof welding takes place at said points of intersection. Thus it is possible to effect welding with the expenditure of substantially less welding energy. As described in connection with FIGS. 1 and 2, spring-actuated pressure stamp 6 is also provided in this case and plates or metal sheets 1 and 2 rest on a supporting table (not shown in the drawing). The welding current is supplied through clamp 31b into plate 2 and is conducted away from plate 1 via another clamp 31a. When using suitable welding parameters, the lower coating 2b will not be damaged. This method of welding the faces of plates together can also be applied to bare metallic plates.

FIG. 4 shows an embodiment similar to that of FIG. 1 but in which the milled recesses at the lower face of plate 1, instead of being arched, are rectangular in shape so that vertical rectangular ribs 10 are formed rather than acute-angled ribs. These ribs 10 will melt away completely on welding and by pressing together the two edge parts of plates 1 and 2. Electric arcs will jump over the gaps between the ribs 10. Thus, the juxtaposed strip-shaped surfaces of said plates will also be welded together.

In this way welding of the entire edge or border surface is achieved. In other respects the procedure is the same as described hereinabove in connection with FIG. 1.

FIG. 5 shows a similar embodiment of the present invention as illustrated in FIG. 2, but with ribs 10 being milled vertically from the stripshaped embossings if at the lower face of plate 1. Coating 1a is removed by milling the upper face of the depressions of the strip-shaped embossings 1f before or after embossing to as to produce a bare metallic surface. Welding rollers 33 are provided which fit and correspond to the shape of the strip-shaped embossings 1f. In addition thereto another welding roller 34 is provided which rests on an edge strip 2e of plate 2 from which coating 2a has been removed. The welding current passes via welding roller 34 into sheet 2 and via ribs 10 to welding rollers 33, and from there back to the current source.

Instead of removing coating 1a from strips 1f, the coating 1a can be left thereon. Then rollers 33 serve merely as pressure rollers and the welding current is fed back via any other stripped area, for instance, by means of clamps as shown in FIG. 2.

Of course, uncoated plates can also be welded in the manner described hereinabove.

FIG. 6 shows an upper plate 1 with coating 1a from which plate the coating is partly removed in the form of strips 1g. Recesses 7 with acute-angled ribs 5 are milled into the lower face of plate 1. Underlying plate 2 is provided with coatings 2a and 2b. Coating 2a is removed from the upper face of plate 2 by milling whereby strips 2d with the exposed metal surface of plate 2 are formed in juxtaposition to recesses 7 and ribs 5. Upper electrode 35 has a lower working face which is provided with protruding ledges 35a which are positioned so that they correspond to and fit strips 1g from which coating 1b is removed. Electrode 35 is placed with spring pressure against said strips 1g. Thereby the milled recesses 7 and ribs 5 are forced towards plate 2. The welding current flows then via electrode 35, acute-angled ribs 5, and strips 2d freed of their coating, into plate 2 and from there back again via clamp 31. If the welding parameters are properly selected, lower coating 2b will remain undamaged.

The above described welding arrangement and method is also suitable for sheet metal plates which are coated only on their contacting faces and not on their outer faces. Of course, only one of the two plates may be coated on its face of contact with the other plate being bare.

Figure 7:
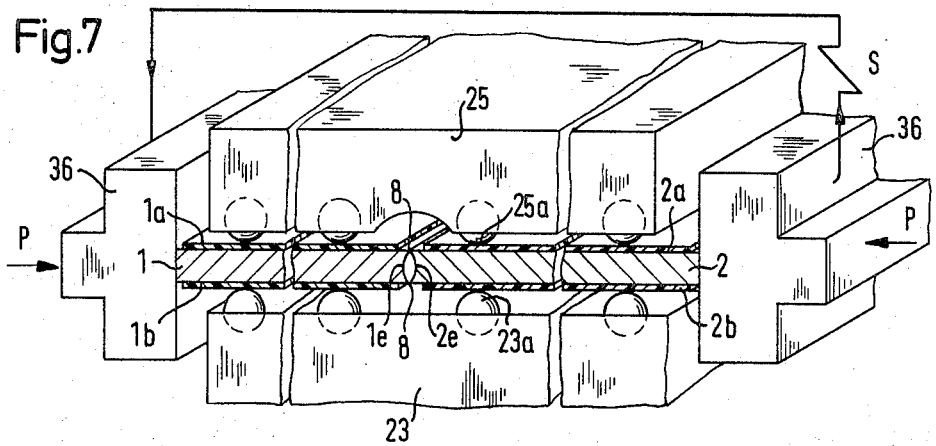
FIG. 7 is a diagrammatic view illustrating in perspective an embodiment of the present invention to butt weld abutting cut edges of two coated metal plates by providing arched recesses in said edges.

FIG. 7 shows sheet metal plate 1 which is to be welded to sheet metal plate 2 along their contacting cut edges. For this purpose the cut edges of plates 1 and 2 are provided with arched milled recesses 1c and 2e which are shaped so that acute-angled ribs 8 remain at their upper and lower edges. To provide a corresponding movable horizontal support for the plates to be connected at their cut edges, the plates are placed on table 23 provided with rollers. For securing the plates, block 25 which is also provided with rollers 25a is placed onto the upper surfaces of the two plates. As a result thereof, the acute-angled ribs 8 of the two plates contact each other precisely opposite each other in the same plane. The welding current is supplied, for instance, via lateral pressure electrodes 36 to the lateral cut edges and ribs 8 and welding takes place under simultaneous spring pressure upon electrodes 36.

The acute-angled contact of ribs 8 results in a very high electrical resistance so that it is possible to effect welding with the expenditure of a relatively small amount of electrical energy. In this way the coatings 1a, 1b, and 2a, 2b, respectively, are protected almost completely against damage.

Of course, instead of supplying and conducting away the welding current to and from the cut edges, it can also be supplied and conducted away to and from stripped areas provided on the surfaces of the two plates.

The above described procedure is just as suitable for bare metallic plates.

Figure 8:
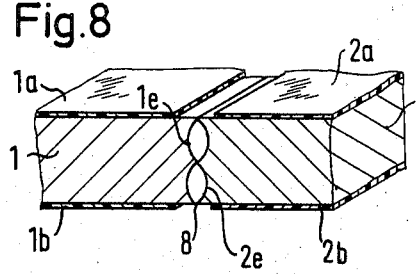
FIGS. 8 to 10 are diagrammatic views similar to that of FIG. 7 and illustrating other shapes of the recesses provided in the cut edges of the abutting plates.

FIG. 8 illustrates another embodiment of the cut edge contact welding method as described in FIG. 7, whereby, in view of the greater thickness of plates 1 and 2, two arched milled recesses 1e and 2e are provided in the edges thus resulting in three acute-angled ribs 8. Depending on the thickness of the plates as many such milled recesses as desired can, of course, be provided in the edges thus producing a correspondingly large number of ribs 8.

Figure 9:
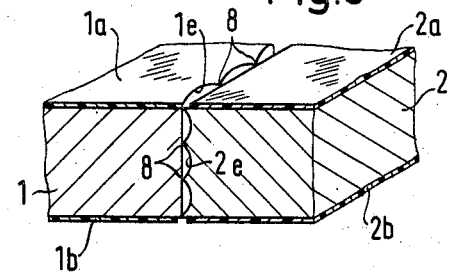

FIG. 9 illustrates another embodiment of the cut edge contact welding method of FIG. 7. Plate 1 is provided with milled recesses 1e perpendicular to the cut edge, while plate 2 is provided with horizontally cut milled recesses 2e. Thus ribs 8 of the two plates intersect (as also shown in FIG. 3), so that welding takes place in a grid-like manner at the points of intersection.

Figure 10:
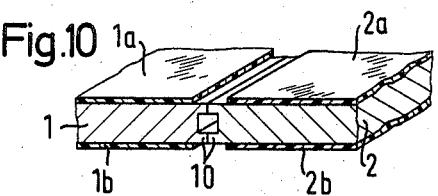

FIG. 10 shows recesses 1e which are milled vertically into the cut edges in place of the arched milled recesses of FIGS. 7 to 9. Thereby there are formed thin linear ribs 10 which melt away on welding and render possible that the cut edges are welded flatly to each other. Thereby, electric arcs may be produced causing arc welding. Of course, depending on the thickness of the plates, as many milled recesses as desired and thus a corresponding number of linear ribs 10 can be formed. Otherwise the procedure is the same as described hereinabove in connection with FIG. 7.

Figure 11:
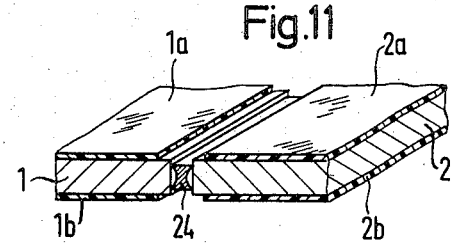
FIGS. 11 to 13 are diagrammatic views illustrating in perspective other embodiments of the present invention to butt weld abutting cut edges of two coated metal plates by providing specifically shaped inserts between the two cut edges.
Figure 12:
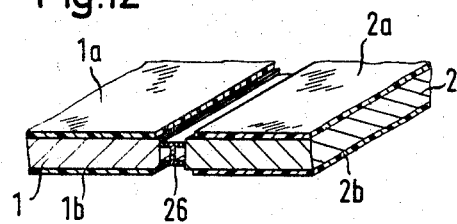
Figure 13:
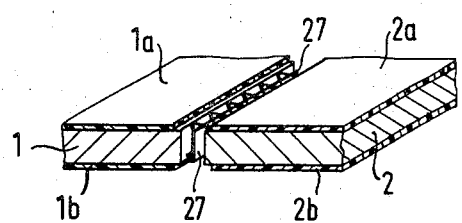

FIGS. 11, 12, and 13 illustrate still other embodiments of the cut edge contact method of FIG. 7. Thereby profiled weld insert strips 24, 26, and/or 27 are used instead of providing milled recesses. These profiled weld inserts are shaped as illustrated in FIGS. 11 to 13. For instance, the insert strip may consist of a metal wire of the cross-section shown in FIG. 6, i.e., a profiled flattened wire 24 provided with two protruding edges on each inwardly arched side. Or it may consist of an H-shaped wire or metal strip 26 as shown in FIG. 12. Or it can be a toothed or pronged metal strip 27 as shown in FIG. 13. These and other shapes of the profiled inserts serve merely as examples of increasing the electrical resistance of the inserts by suitably profiling the same. The zigzag-shaped insert 27 of FIG. 13 with sharp projections alternately extending toward the cut edge of the one plate 1 and the cut edge of the other plate 2 produces a particularly high resistance.

Of course, resistance welding as shown in FIGS. 7 to 13 can be carried out with metal plates which are not coated.

I claim:

1. The method of resistance welding of coated metal articles to each other along superimposed lateral edges thereof by means of electric current, comprising the steps of:

a. removing the coating layers from the confronting faces of said lateral edges to be welded, b. milling out by means of a milling cutter a substantial thickness of one of said metal articles on the lateral edge thereof to be welded, c. milling out by means of a milling cutter at least three contact bridges on the confronting face of the other of said metal articles, said contact bridges being generally equal in transverse dimension to the milled out area on the opposed metal article, d. establishing pressure contact of said contact bridges with the opposed blank metal face, e. insulating the end faces of said superimposed metal articles so as to confine the welding current to be subsequently supplied to a path through said contact bridges, and f. supplying electric welding current by current conducting means to one of the metal articles at a region spaced from said contact bridges, said current travelling through said one metal article and the contact bridges to the contact opposed blank metal face of the other metal article thereby effecting welding, the current being conducted away from the other one of the metal articles at a region spaced from said contact bridges, whereby the metal articles are welded only in the weld area defined by said contact bridges.

2. The method of claim 1, in which the contact bridges are linear contact bridges.

3. The method of claim 2, in which said contact bridges are in the form of upwardly arched grooves having points which engage the surface of the confronting metal article.

4. The method of claim 2, in which the contact bridges are rectangular in form.

5. The method of claim 1, in which the surface areas to be welded are contacted with each other under the pressure of currentless pressure-exerting means.

6. The process of claim 1, in which the current conducting means are clamps.

7. The method of claim 1, in which welding is effected by means of condenser discharge welding machines.

8. The method of claim 1, wherein said coating layer is of insulating material.

9. The method of claim 1, wherein said coating layer is a metallic coating having a different conductivity than the conductivity of the metal article itself.

10. The method of claim 1, wherein the metal articles to be welded are of different metals.

* * * * *

PC-1050
(5/69)

UNITED STATES PATENT OFFICE
CERTIFICATE OF CORRECTION

Patent No. 3,805,014  Dated April 16, 1974

Inventor(s) OTTO ALFRED BECKER

It is certified that error appears in the above-identified patent and that said Letters Patent are hereby corrected as shown below:

Column 1, line 52: "ar" should read -- are --.

Column 2, line 38: "core-" should read -- corre- --.

Column 5, line 45: "emobossings" should read -- embossings --.

Column 6, line 46: "if" should read -- 1 f --.

Column 6, line 49: "to" should read -- so --.

Signed and Sealed this second Day of March 1976

[SEAL]

Attest:

RUTH C. MASON
Attesting Officer

C. MARSHALL DANN
Commissioner of Patents and Trademarks